(12) United States Patent
Qu et al.

(10) Patent No.: US 11,495,851 B2
(45) Date of Patent: Nov. 8, 2022

(54) SOLAR ELECTROOSMOSIS POWER GENERATION DEVICE

(71) Applicant: Xi'an Jiaotong University, Xi'an (CN)

(72) Inventors: Zhiguo Qu, Xi'an (CN); Qiang Wang, Xi'an (CN); Jiajia Zhang, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 128 days.

(21) Appl. No.: 17/061,573

(22) Filed: Oct. 1, 2020

(65) Prior Publication Data

US 2021/0194080 A1      Jun. 24, 2021

(30) Foreign Application Priority Data

Dec. 19, 2019   (CN) .......................... 201911321802.1

(51) Int. Cl.
*H01G 9/20*       (2006.01)
*H01M 14/00*      (2006.01)

(52) U.S. Cl.
CPC ............ *H01M 14/005* (2013.01); *H01G 9/20* (2013.01)

(58) Field of Classification Search
CPC ...................................................... H01G 9/20
See application file for complete search history.

(56) References Cited

U.S. PATENT DOCUMENTS 3,370,983 A * 2/1968 Lander .................. H01M 8/186
                                                        429/11
5,136,474 A * 8/1992 Sarangapani ........... H01G 9/025
                                                       29/25.03
8,525,020 B2 * 9/2013 Fusalba ................ H01G 9/2068
                                                       136/251

FOREIGN PATENT DOCUMENTS

CN    106533326 A  *  3/2017  ............. H02S 10/10
CN    110980851 A  *  4/2020  ................ C02F 1/14

OTHER PUBLICATIONS

N. A. Kotov, et al., "A Photoelectrochemical Effect at the Interface of Immiscible Electrolyte Solutions", Journal of Electro-analytical Chemistry and Interfacial Electrochemistry, vol. 285, No. 1-2, XP 002473813, Jun. 11, 1990, pp. 223-240.*

(Continued)

*Primary Examiner* — Golam Mowla
(74) *Attorney, Agent, or Firm* — Cook Alex Ltd.

(57) ABSTRACT

Solar electroosmosis power generation devices and methods thereof are disclosed. In some embodiments, a first electrode in transparent inorganic electrolyte solution is provided in a first temperature chamber including a first light-transmitting wall. A second electrode in transparent inorganic electrolyte solution is provided in a second temperature chamber including a second light-tight wall. The first and second temperature chambers are connected by a cation nano-film with nanoparticles on its surface close to the first temperature chamber. An external circuit connects the first and second electrodes. When the nano-film is irradiated through the first wall by sunlight, the temperature of the first temperature chamber is higher than that of the second temperature chamber. In some embodiments, the solar electroosmosis power generation device improves solar energy utilization efficiency, and can be used in the field of solar light-heat-electric conversion.

18 Claims, 2 Drawing Sheets

(56) References Cited

OTHER PUBLICATIONS

Z Samec, et al., "A Generalised Model for Dynamic Photocurrent Responses at Dye-Sensitised Liquid|Liquid Interfaces", Journal of Electro-analytical Chemistry and Interfacial Electrochemistry, vol. 577, No. 2, XP 004786539, 2005, pp. 323-337.*

* cited by examiner

| | |
|---|---|
| 100 | Sunlight irradiating the composite nano-film close to the first temperature chamber through the first wall, wherein sunlight irradiates the film main body of graphene oxide or derivatives thereof to generate a photo-Dember effect, thus the film absorbs and converts solar energy into a potential difference, resulting in that the potential on the area near first temperature chamber is lower than that near the second temperature chamber, and further, the nanoparticles embedded at one side of film are irradiated to generate a localized surface plasmon resonance, resulting in that the temperature of first temperature chamber is rising. |
| 200 | Solution ions in the chambers generating an electrochemical potential difference by both the potential difference between two sides of composite nano-film and the temperature difference between the first temperature chamber and the second temperature, so that cations in the second temperature chamber enter the first temperature chamber through the nano-film. |
| 300 | Terminating illumination, and completing charging until the temperature of first temperature chamber is stable, wherein the solution ion concentration in the first temperature chamber is higher than that in second temperature chamber. |
| 400 | The concentration difference obtained in 300 driving the cations of first temperature chamber to enter the second temperature chamber through the ion channels of composite nano-film. |
| 500 | Electrons in the external circuit migrating from the first electrode to the second electrode to form a current, thereby generating electricity. |
| 600 | Ending the first power generation cycle when the ion concentration in two temperature chamber are equal with no current in external circuit. |
| 700 | Sunlight irradiating again the composite nano-film close to the first temperature chamber, and starting the second power generation cycle. |

SOLAR ELECTROOSMOSIS POWER GENERATION DEVICE

CROSS-REFERENCE TO RELATED APPLICATION(S)

This application claims priority benefits to Chinese Patent Application No. 201911321802.1, entitled "Solar Power Generation Device" filed with the China National Intellectual Property Administration on Dec. 19, 2019.

The '802.1 application is incorporated herein by reference in its entirety.

FIELD OF THE INVENTION

The disclosure relates to solar power generation, in particular to solar electroosmosis power generation devices and solar power generation methods.

With a continuing energy crisis and increasing environmental issues, advancements of clean solar energy are urgently needed. The renewable energy power generation technology for converting solar energy into electricity is an effective way for solving the energy and environmental dilemma.

At present, two main methods for utilizing solar energy to generate electricity are available. One is utilizing the heat energy of solar radiation to realize a step-by-step conversion of light-heat-electricity with quite high cost, extremely low efficiency, and difficult commercial promotion. The other method is a mode of realizing direct light-electricity conversion by photovoltaic cells based on the photovoltaic effect, which has been commercialized, but it has the disadvantages of low photoelectric conversion efficiency, high pollution, and energy consumption.

SUMMARY OF THE INVENTION

In view of above problems, the present disclosure provides, among other things, a solar electroosmosis power generation device integrating photothermal-photoelectric-thermoelectric modules into a system for improving the solar energy utilization efficiency.

In some embodiments, a solar electroosmosis power generation device includes:

a first temperature chamber with transparent inorganic electrolyte solution and a first electrode provided therein; wherein, the first temperature chamber includes at least one first light-transmitting wall;

a second temperature chamber with transparent inorganic electrolyte solution and a second electrode provided therein; wherein, the second temperature chamber includes a second light-tight wall;

a nano-film respectively connected with the first temperature chamber and the second temperature chamber so that the first temperature chamber and the second temperature chamber can communicate; wherein the nano-film includes a film main body generating a photo-Dember effect and nanoparticles arranged on a first side of the film main body facing the first temperature chamber, and light irradiates the nano-film through the first wall to enable a first temperature of the first temperature chamber to be higher than a second temperature of the second temperature chamber, and cations in the second temperature chamber enter the first temperature chamber through the nano-film;

an external circuit connecting the first electrode with the second electrode, wherein when the ion concentration of the solution in the first temperature chamber is higher than that in the second temperature chamber to form a concentration difference, electrons in the external circuit migrate from the first electrode to the second electrode to generate current.

In some embodiments, the nano-film includes a multi-layer film main body, and at least one ion channel for connecting the first temperature chamber with the second temperature chamber are arranged between adjacent layers of the film main body.

In some embodiments, the at least one ion channel includes a surface layer with negative charges.

In some embodiments, the film main body includes one or more films made of graphene oxide or derivatives thereof. In some embodiments, the thickness of each film is no more than 200 nm. In some embodiments, the nanoparticles include gold or silver or derivatives thereof. In some embodiments, the size of the nanoparticles is 10-100 nm. In some embodiments, the height of each ion channel is 2-30 nm. In some embodiments, the total thickness of the film main body is no more than 400 nm.

In some embodiments of the solar electroosmosis power generation device, the transparent inorganic electrolyte solution in the first temperature chamber includes a nanofluid of gold, silver, or a derivative thereof. In some embodiments, the first wall is made of a highly light-transmitting resin material.

In some embodiments of the solar electroosmosis power generation device, the transparent inorganic electrolyte solution generates an electrochemical potential difference under the action of the potential difference between two sides of the nano-film and the temperature difference between the first temperature chamber and the second temperature chamber.

In some embodiments, when the at least one ion channel is narrowed to be within a predetermined threshold range through the electrochemical potential difference, only, or at least essentially only, cations pass through the ion channel. In some embodiments, the predetermined threshold is 2-15 nm. In some embodiments, the external circuit includes a switch, a current measuring unit or a voltage measuring unit.

In some embodiments, a method for generating power includes the following steps: a first step, sunlight irradiating a first side of a nano-film through a first wall, the nano-film generating a photo-Dember effect to convert absorbed solar energy into a potential difference, and nanoparticles on the first side generating heat through irradiation, wherein the potential on the nano-film close to the first temperature chamber area is lower than the potential on the nano-film close to a second temperature chamber area, and the nanoparticles absorb and convert solar energy into thermal energy to cause the temperature of the first temperature chamber to rise;

a second step, the transparent inorganic electrolyte solution generating electrochemical potential energy difference via the potential difference between the two sides of the nano-film and the temperature difference between the first temperature chamber and the second temperature chamber, so that cations in the second temperature chamber enter the first temperature chamber through the nano-film;

a third step, terminating the illumination until the temperature of the first temperature chamber is stable, and the ion concentration of the solution in the first temperature chamber is higher than that in the second temperature chamber, so as to form concentration difference; and a fourth step, driving cations of the solution in the first temperature chamber to enter the second temperature chamber through at least one ion channel of the nano-film by the concentration difference, and electrons in an external circuit migrating from the first electrode to the second electrode to form current, until the ion concentration of the solution in the first temperature chamber is equal to that in the second temperature chamber and no current flows in the external circuit to complete power generation. In some embodiments, the method returns to the first step for circular power generation.

In some embodiments, based on the electroosmotic selective ion channel, the photothermal effect, and the photo-Dember effect of the nano-film, the disclosed devices effectively integrate the photothermal-photoelectric-thermoelectric modules by embedding photothermal nanoparticles, realize the ion directional transportation under the drive of solar energy, and further convert it into electric energy for output. This improves the utilization efficiency of the solar energy. At least some of the disclosed embodiments provide social, environmental, and economic benefits via repeated recycling. At least some of the disclosed embodiments can be widely applied to the field of solar light-thermal-electric conversion.

BRIEF DESCRIPTION OF THE DRAWINGS

FIG. 3 is a schematic diagram of a method for generating power according to one embodiment.

DETAILED DESCRIPTION OF ILLUSTRATIVE EMBODIMENT(S)

Figure 1:
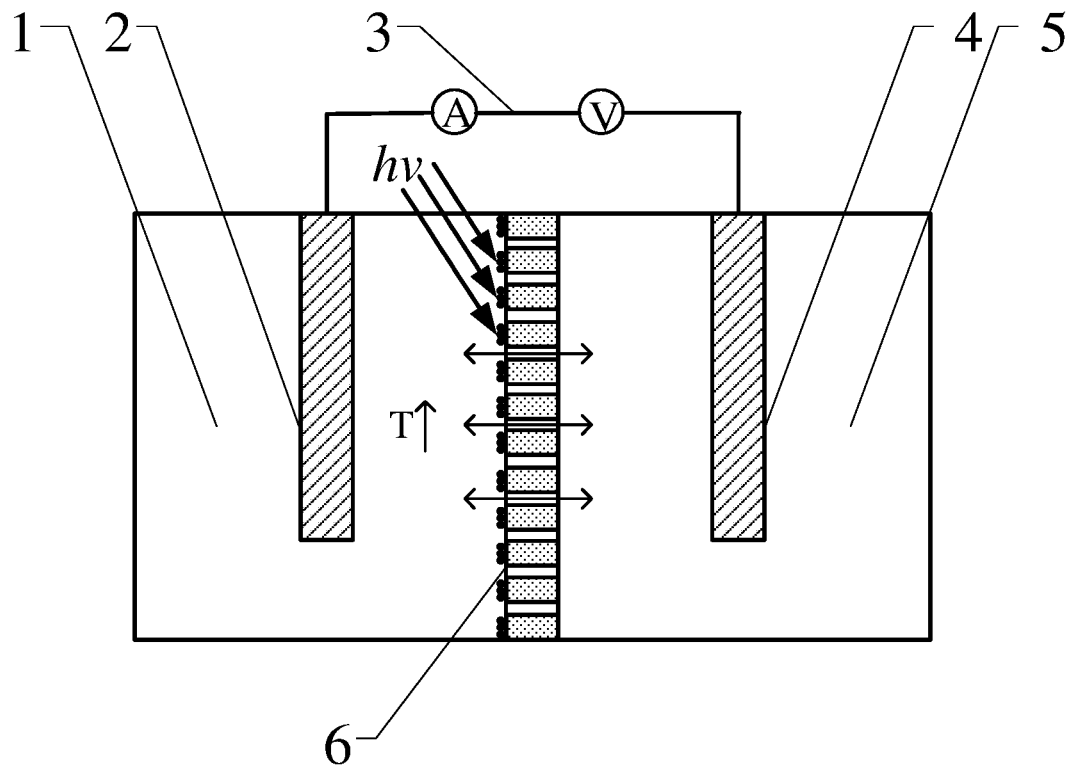
FIG. 1 is a schematic structure diagram of a solar electroosmosis power generation device according to one embodiment.

Various advantages and benefits of the present disclosure will become apparent by reading the following detailed description of optional embodiments. The drawings are in purpose of illustrating the optional embodiments and are not to be construed as limiting the disclosure. The drawings described below are only some embodiments of the disclosure, and other drawings can be derived from them without inventive effort. Furthermore, same parts are designated by the same reference numerals throughout the drawings.

Specific embodiments of the present disclosure will be described in detail below with reference to the drawings. While specific embodiments of the disclosure are shown in the drawings, the disclosure may be embodied in various forms and should not be construed as limited to the embodiments set forth herein. These embodiments are provided so that this disclosure will be thoroughly understood and will fully convey the scope of the disclosure.

It should be noted that certain terms are used throughout the description and claims to refer to particular components. Various names may be used to refer to a same component. The specification and claims intend to distinguish components not with different terms, but with functions of components as criteria for distinguishing. In the following description and claims, the terms "include" and "comprise" are used in an open-ended fashion, and thus they should be interpreted to mean "include, but not limited to". The following description is optional embodiments of the disclosure, but it is made for illustrating the general principles of the disclosure, rather than limiting the scope of the disclosure.

For the purpose of facilitating understanding of embodiments of the present disclosure, the following description will be made by taking specific embodiments as examples with reference to the accompanying drawings, and the drawings are not to be construed as limiting the embodiments of the present disclosure.

FIG. 1 illustrates a solar electroosmosis power generation device. A solar electroosmosis power generation device includes:

a first temperature chamber 1, in which transparent inorganic electrolyte solution and a first electrode 2 are provided, said first temperature chamber 1 including at least one first light-transmitting wall;

a second temperature chamber 5 in which transparent inorganic electrolyte solution and a second electrode 4 are provided, said second temperature chamber 5 including a second light-tight wall;

a nano-film 6 respectively connected with the first temperature chamber 1 and the second temperature chamber 5 such that the first temperature chamber 1 and the second temperature chamber 5 can communicate; wherein, nano-film 6 includes a film main body that generates a photo-Dember effect and nanoparticles 7 disposed on a first side of the main film body facing the first temperature chamber 1, and in some embodiments, light irradiates the nano-film 6 through the first wall so that a first temperature of the first temperature chamber 1 is higher than a second temperature of the second temperature chamber 5, and cations in the second temperature chamber 5 enter the first temperature chamber 1 through the nano-film 6;

an external circuit 3 connecting the first electrode 2 with the second electrode 4, wherein when the ion concentration of the solution in the first temperature chamber 1 is higher than that in the second temperature chamber 5 to form a concentration difference, electrons in the external circuit 3 migrate from the first electrode 2 to the second electrode 4 to generate current.

In some embodiments, the light-absorption material is chosen to utilize solar energy and improve the photo-thermal-electric conversion efficiency. In some embodiments, the photo-Dember effect can be generated when the material is irradiated by asymmetric light. For example, when graphene oxide or a derivative thereof is subjected to asymmetric illumination, photoelectrons and holes in the illuminated area can diffuse to a non-illuminated area under a driving of respective density gradients, and the materials can generate charge redistribution and form a potential difference due to the fact that the diffusivity and the mobility of the holes are higher than those of the electrons, so that the potential of the illuminated area is lower than that of the non-illuminated area.

Although the photoelectric conversion capability of the photo-Dember effect is influenced by factors such as illumination sites and illumination intensity, the embodiments utilizes the potential difference across hundreds of nanometers generated by the photo-Dember effect to drive a trans-membrane directional migration of cations from a non-illumination side to an illumination side.

In some embodiment of the solar electroosmosis power generation device, the nano-film 6 includes a multi-layer film main body. In some embodiments, at least one ion channel connecting the first temperature chamber 1 and the second temperature chamber 5 is disposed between adjacent layers of the film main body.

In some embodiments of the solar electroosmosis power generation device, the at least one ion channel includes a surface layer with negative charges.

In some embodiments of the solar electroosmosis power generation device, the film main body includes one or more films made of graphene oxide or derivatives thereof. In some embodiments, the thickness of each film is no more than 200 nm. In some embodiments, nanoparticles 7 include gold or silver or derivatives thereof, and the size of the nanoparticles 7 is 10-100 nm.

In some embodiments, the height of each ion channel is 2-30 nm.

In some embodiments, the total thickness of the film body is no more than 400 nm.

In some embodiments, the transparent inorganic electrolyte solution in the first temperature chamber 1 includes a nanofluid of gold, silver, or a derivative thereof. In some embodiments the first wall is made of a highly light-transmitting resin material.

In some embodiments, the transparent inorganic electrolyte solution generates an electrochemical potential difference under an action of the potential difference between two sides of the nano-film 6 and the temperature difference between the first temperature chamber 1 and the second temperature chamber 5.

In some embodiments, when the at least one ion channel is narrowed to be within a predetermined threshold range through the electrochemical potential difference, only cations pass through the at least one ion channel. In some embodiments, the predetermined threshold is 2-15 nm. In some embodiments external circuit 3 includes a switch, a current measuring unit or a voltage measuring unit.

In some embodiments, a solar electroosmosis power generation device includes a first temperature chamber 1 as a high temperature chamber, a first electrode 2 as a high temperature electrode in the first temperature chamber 1, a second temperature chamber 5 as a low temperature chamber, a second electrode 4 as a low temperature electrode in the second temperature chamber 5, a nano-film 6 disposed between the high temperature chamber and the low temperature chamber, and an external circuit 3 communicating the electrodes in the two chambers. The high temperature chamber and the low temperature chamber are filled with transparent inorganic electrolyte solution. When sunlight irradiates the nano-film through the first wall, the first temperature of the first temperature chamber 1 is higher than the second temperature of the second temperature chamber 5.

In some embodiments, the solution in the high temperature chamber is a nanofluid containing gold, silver, or derivatives thereof. In some embodiments, the wall of the chamber is made of a high light-transmitting resin material.

In some embodiments of the solar electroosmosis power generation device, the nano-film 6 is a single-layer or multi-layer film which includes graphene oxide or derivative thereof as a main body 8 and is embedded with the nanoparticles 7 on the side close to the first temperature chamber. In some embodiments, the thickness of each layer of the film is no more than 200 nm. In some embodiments, the total thickness of the film is no more than 400 nm.

In some embodiments of the solar electroosmosis power generation device, the nano-film 6 includes at least one ion channel 9 connecting the first temperature chamber and the second temperature chamber.

In some embodiments, the at least one ion channel 9 includes a surface layer with negative charges. In some embodiments, the height of each ion channel 9 is 2-30 nm.

In some embodiments of the solar electroosmosis power generation device, the nanoparticles 7 are gold, silver, or derivatives thereof. In some embodiments, the size of the nanoparticles is 10-100 nm.

In some embodiments of the solar electroosmosis power generation device, the first wall is made of a highly light-transmitting resin material.

Figure 2:
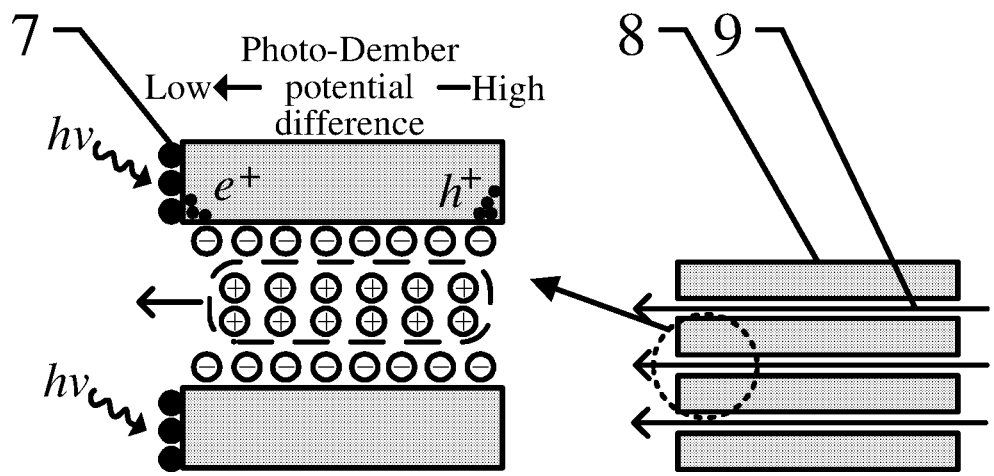
FIG. 2 is a schematic diagram of a nano-film and cation-selective channels in a solar electroosmosis power generation device according to one embodiment.

In some embodiments, a nano-film and selective ion channel of a solar electroosmosis power generation device can include: main body 8 made of graphene oxide or a derivative thereof, nanoparticles 7 ions of which are on the membrane near the first temperature chamber, and parallel channels 9, as shown in FIG. 2. In some embodiments, the membrane main body forms an ion channel surface layer with a negative charge. In some embodiments, when the channel is narrowed to a certain range (namely 2-15 nm), the double electric layers of the upper surface layer and the lower surface layer are superposed, and only, or least essentially only, ions with opposite charges, namely cations, can pass through the channel according to Coulomb's law. In some embodiments, the double electric layers are superposed to accelerate the passing of cations, thereby improving the final power generation efficiency.

In some embodiments of the solar electroosmosis power generation device, according to the principle of double electric layer, the directional migration of ions under the joint action of temperature difference and potential difference can be realized through the cation-selective channel 9 in the nano-film 6 under the driving of solar energy, so that the light-heat-electric modules are effectively integrated, facilitating the simplification of a solar energy utilization system. In addition, the disclosure can realize repeated cycle power generation and is easy to use.

In some embodiments a power generation method of a solar electroosmosis power generation device can include the following steps:

a first step: sunlight irradiating a first side of a nano-film through a first wall, the nano-film generating a photo-Dember effect to convert absorbed light energy into a potential difference, and nanoparticles on the first side generating heat through irradiation, wherein the potential on the nano-film close to a first temperature chamber area is lower than the potential on the nano-film close to a second temperature chamber area, and the nanoparticles absorb and convert light energy into thermal energy to cause the temperature of the first temperature chamber to rise;

a second step: the transparent inorganic electrolyte solution generating electrochemical potential energy difference by both the potential difference between the two sides of the nano-film and the temperature difference between the first temperature chamber and the second temperature chamber, so that cations in the second temperature chamber enter the first temperature chamber through the nano-film;

a third step: terminating the illumination until the temperature in the first temperature chamber is stable, such that the ion concentration of the solution in the first temperature chamber is higher than that in the second temperature chamber so as to form concentration difference; and a fourth step: driving the cations of the solution in the first temperature chamber to enter the second temperature chamber through at least one ion channel of the nano-film by the concentration difference, and electrons in the external circuit migrating from the first electrode to the second electrode to form current, until the ion concentration of the solution in the first temperature chamber is equal to that in the second temperature chamber and no current flows in the external circuit to complete power generation. In some embodiments the method returns to the first step to generate power circularly.

In the embodiment shown in FIG. 3, a method for generating power for a solar power device includes steps 100-700 as follows.

In step 100, sunlight irradiates nano-film 6 close to the first temperature chamber 1 through the first wall wherein sunlight irradiates the film main body 8 made of graphene oxide or derivatives thereof to generate a photo-Dember effect. The film absorbs and converts light energy into a potential difference, resulting in that the potential on the area near the first temperature chamber 1 is lower than the potential on the area near the second temperature chamber 5. The nanoparticles 7 embedded at one side of the film are irradiated to generate a localized surface of plasmon resonance. The nanoparticles 7 absorb and convert light energy into heat, resulting in that the temperature of the first temperature chamber 1 rises;

In step 200, ions in the solution in the chambers generate an electrochemical potential difference by both the potential difference between the two sides of the nano-film 6 and the temperature difference between the first temperature chamber 1 and the second temperature chamber 5. In this way, cations in the second temperature chamber 5 enter the first temperature chamber 1 through the nano-film 6.

In step 300, the illumination is terminated until the temperature of the first temperature chamber 1 is stabilized, and at this time, the ion concentration of the solution in the first temperature chamber 1 is higher than that in the second temperature chamber 5.

In step 400, the concentration difference obtained in step 300 drives the cations of the solution in the first temperature chamber 1 to enter the second temperature chamber 5 through the at least one ion channel 9 of nano-film 6.

In step 500, electrons in the external circuit 3 migrate from the first electrode 2 to the second electrode 4 to form a current, thereby generating electricity.

In step 600, the first power generation cycle ends until the ion concentration of the solution in the first temperature chamber 1 is equal to that in the second temperature chamber 5 and no current flows through the external circuit 3.

In step 700, the solar light again irradiates nano-film 6 close to the first temperature chamber 1 and starts a second power generation cycle.

The solar electroosmosis power generation device and the power generation method can be respectively manufactured and used in the field of solar power generation.

The foregoing describes the general principles of the present application in conjunction with specific embodiments, however, it is noted that the advantages, effects, etc. mentioned are merely examples and are not limiting. They should not be considered essential to the various embodiments. Furthermore, the foregoing disclosure is for the purpose of illustration and easy understanding. It is not intended to be limiting. The application does not have to be implemented using the above specific details.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A solar electroosmosis power generation device comprising:
   a first temperature chamber with transparent inorganic electrolyte solution and a first electrode provided therein, wherein, the first temperature chamber comprises at least one first light-transmitting wall;
   a second temperature chamber with the transparent inorganic electrolyte solution and a second electrode provided therein, wherein, the second temperature chamber comprises at least one second light-tight wall;
   a nano-film respectively connected with the first temperature chamber and the second temperature chamber so that the first temperature chamber and the second temperature chamber communicate, wherein the nano-film comprises a film main body configured to generate a photo-Dember effect and nanoparticles arranged on a first side of the film main body facing the first temperature chamber, and light irradiates the nano-film through the at least one first light-transmitting wall to enable a first temperature of the first temperature chamber to be higher than a second temperature of the second temperature chamber, and cations in the second temperature chamber enter the first temperature chamber through the nano-film;
   an external circuit connected with the first electrode and the second electrode, wherein when ion concentration of the solution in the first temperature chamber is higher than that in the second temperature chamber to form a concentration difference, electrons in the external circuit migrate from the first electrode to the second electrode to generate a current.

2. The solar power electroosmosis generation device of claim 1, wherein the nano-film comprises a multi-layer film main body, and at least one ion channel for connecting the first temperature chamber and the second temperature chamber is provided between adjacent layers of the film main body.

3. The solar electroosmosis power generation device of claim 2, wherein the at least one ion channel comprises a surface layer with negative charges.

4. The solar electroosmosis power generation device of claim 1, wherein the film main body comprises one or more films made of graphene oxide or a derivative thereof, the thickness of each film is no more than 200 nm, and the nanoparticles comprise gold, silver or a derivative thereof, and the nanoparticles have a size of 10-100 nm.

5. The solar electroosmosis power generation device of claim 2, wherein the height of the at least one ion channel is 2-30 nm.

6. The solar electroosmosis power generation device of claim 1, wherein the total thickness of the film main body is no more than 400 nm.

7. The solar electroosmosis power generation device of claim 1, wherein the transparent inorganic electrolyte solution in the first temperature chamber comprises a nanofluid of gold, silver or derivatives thereof, and the at least one first light-transmitting wall is made of a highly light-transmitting resin material.

8. The solar electroosmosis power generation device of claim 3, wherein the transparent inorganic electrolyte solution generates an electrochemical potential difference under the action of a potential difference between two sides of the nano-film and a temperature difference between the first temperature chamber and the second temperature chamber, and when the at least one ion channel is narrowed to be within a predetermined threshold range through the electrochemical potential difference, only cations pass through the at least one ion channel.

9. The solar electroosmosis power generation device of claim 8, wherein the predetermined threshold is 2-15 nm and the external circuit comprises a switch, a current measuring unit or a voltage measuring unit.

10. A method for generating power based on the solar electroosmosis power generation device which comprises:
- a first temperature chamber with transparent inorganic electrolyte solution and a first electrode provided therein, wherein, the first temperature chamber comprises at least one first light-transmitting wall;
- a second temperature chamber with the transparent inorganic electrolyte solution and a second electrode provided therein, wherein, the second temperature chamber comprises at least one second light-tight wall;
- a nano-film respectively connected with the first temperature chamber and the second temperature chamber so that the first temperature chamber and the second temperature chamber communicate, wherein the nano-film comprises a film main body configured to generate a photo-Dember effect and nanoparticles arranged on a first side of the film main body facing the first temperature chamber, and light irradiates the nano-film through the at least one first light-transmitting wall to enable a first temperature of the first temperature chamber to be higher than a second temperature of the second temperature chamber, and cations in the second temperature chamber enter the first temperature chamber through the nano-film;
- an external circuit connected with the first electrode and the second electrode, wherein when ion concentration of the solution in the first temperature chamber is higher than that in the second temperature chamber to form a concentration difference, electrons in the external circuit migrate from the first electrode to the second electrode to generate a current, the method comprising:
- a first step, sunlight irradiating a first side of the nano-film through the first wall, the nano-film generating a photo-Dember effect to convert absorbed light energy into a potential difference, and nanoparticles on the first side generating heat through irradiation, wherein the potential on the nano-film close to a first temperature chamber is lower than that close to a second temperature chamber, and the nanoparticles absorb and convert the light energy into thermal energy to cause the temperature of the first temperature chamber to rise; and
- a second step, the transparent inorganic electrolyte solution generating an electrochemical potential difference by both the potential difference between two sides of the nano-film and the temperature difference between the first temperature chamber and the second temperature chamber, so that cations in the second temperature chamber enter the first temperature chamber through the nano-film; and
- a third step, terminating the illumination until the temperature of the first temperature chamber is stable, and the ion concentration of the transparent inorganic electrolyte solution in the first temperature chamber is higher than that in the second temperature chamber so as to form concentration difference;
- a fourth step, driving cations of the transparent inorganic electrolyte solution in the first temperature chamber to enter a second temperature chamber through at least one ion channel of the nano-film by the concentration difference, and
- a fifth step, electrons in an external circuit migrating from the first electrode to the second electrode to form current until the ion concentration of the solution in the first temperature chamber is equal to that in the second temperature chamber and no current flows in the external circuit to complete power generation, and
- a sixth step, returning to the first step for circular power generation.

11. The method for generating power based on the solar electroosmosis power generation device of claim 10, wherein the nano-film comprises a multi-layer film main body, and the at least one ion channel for connecting the first temperature chamber and the second temperature chamber is provided between adjacent layers of the film main body.

12. The method for generating power based on the solar electroosmosis power generation device of claim 11, wherein the at least one ion channel comprises a surface layer with negative charges.

13. The method for generating power based on the solar electroosmosis power generation device of claim 10, wherein the film main body comprises one or more films made of graphene oxide or a derivative thereof, the thickness of each film is no more than 200 nm, and the nanoparticles comprise gold, silver or a derivative thereof, and the nanoparticles have a size of 10-100 nm.

14. The method for generating power based on the solar electroosmosis power generation device of claim 11, wherein the height of the at least one ion channel is 2-30 nm.

15. The method for generating power based on the solar electroosmosis power generation device of claim 10, wherein the total thickness of the film main body is no more than 400 nm.

16. The method for generating power based on the solar electroosmosis power generation device of claim 10, wherein the transparent inorganic electrolyte solution in the first temperature chamber comprises a nanofluid of gold, silver or derivatives thereof, and the at least one first light-transmitting wall is made of a highly light-transmitting resin material.

17. The method for generating power based on the solar electroosmosis power generation device of claim 12, wherein the transparent inorganic electrolyte solution generates an electrochemical potential difference under the action of a potential difference between two sides of the nano-film and a temperature difference between the first temperature chamber and the second temperature chamber, and when the at least one ion channel is narrowed to be within a predetermined threshold range through the electrochemical potential difference, only cations pass through the at least one ion channel.

18. The method for generating power based on the solar electroosmosis power generation device of claim 17, wherein the predetermined threshold is 2-15 nm and the external circuit comprises a switch, a current measuring unit or a voltage measuring unit.

* * * * *